United States Patent
Harty, Sr. et al.

(10) Patent No.: US 11,700,834 B2
(45) Date of Patent: Jul. 18, 2023

(54) SUPPORT ELEMENT AND A METHOD FOR SUPPORTING AN ELONGATED BEAM, AND A ROTARY PLATFORM

(71) Applicant: DAIRYMASTER, County Kerry (IE)

(72) Inventors: Edmond Patrick Harty, Sr., County Kerry (IE); Edmond Patrick Harty, Jr., County Kerry (IE); John Gerard Daly, County Kerry (IE); David Jeremiah Fleming, County Kerry (IE); John Harty, County Kerry (IE)

(73) Assignee: DAIRYMASTER, County Kerry (IE)

( * ) Notice: Subject to any disclaimer, the term of this patent is extended or adjusted under 35 U.S.C. 154(b) by 0 days.

(21) Appl. No.: 16/646,376

(22) PCT Filed: Sep. 12, 2018

(86) PCT No.: PCT/IE2018/000010
§ 371 (c)(1),
(2) Date: Mar. 11, 2020

(87) PCT Pub. No.: WO2019/053701
PCT Pub. Date: Mar. 21, 2019

(65) Prior Publication Data
US 2020/0267931 A1 Aug. 27, 2020

(30) Foreign Application Priority Data

Sep. 12, 2017 (IE) .................................... 2017/0180

(51) Int. Cl.
*F16M 11/00* (2006.01)
*A01K 1/12* (2006.01)
(Continued)

(52) U.S. Cl.
CPC ................ *A01K 1/126* (2013.01); *F16B 9/00* (2013.01); *F16C 13/006* (2013.01); *F16C 19/507* (2013.01)

(58) Field of Classification Search
CPC ......... A01K 1/126; F16B 9/00; F16C 13/006; F16C 19/507
See application file for complete search history.

(56) References Cited

U.S. PATENT DOCUMENTS 5,784,993 A * 7/1998 Osthues ................. A01K 1/126
119/14.02
9,179,639 B2 * 11/2015 Van De Walle ........ A01J 5/007
(Continued)

FOREIGN PATENT DOCUMENTS

GB        2 523 229 A      8/2015
WO    2007/114778 A1    10/2007
(Continued)

OTHER PUBLICATIONS

International Search Report for PCT/IE2018/000010 dated Dec. 5, 2018 (PCT/ISA/210).
(Continued)

*Primary Examiner* — Amy J. Sterling
(74) *Attorney, Agent, or Firm* — Sughrue Mion, PLLC

(57) ABSTRACT

A rotary milking platform (1) comprises a platform (3) having a circular carrier beam (7) secured to the underside of the platform (3). The carrier beam (7) is supported on a plurality of support elements (10), each of which comprise a freely rotatable roller (35) which is configured to rollably engage an under surface (38) of the carrier beam (7). Each support element (10) comprises an anchor plate (27) adjustably mounted on a corresponding ground engaging element (20) which is secured to the ground. A carrier plate (40) is carried on four guide bolts (50) extending upwardly from the anchor plate (27). Side members (41) extending downwardly from the carrier plate (40) rotatably carry the roller (35). Compression springs (59) acting between abutment washers (55) secured to the guide bolts (50) and the carrier plate (40) urge the carrier plate (40) against heads (53) of the guide bolts (50). The compression springs (59) accommodate downward and upward movement of the roller (35) in order to accommodate rising and falling of the under surface (38) of the beam (7). The compression springs (59) permit tilting movement of the roller (35) about a tilt axis (61)

(Continued)

Figure 1:
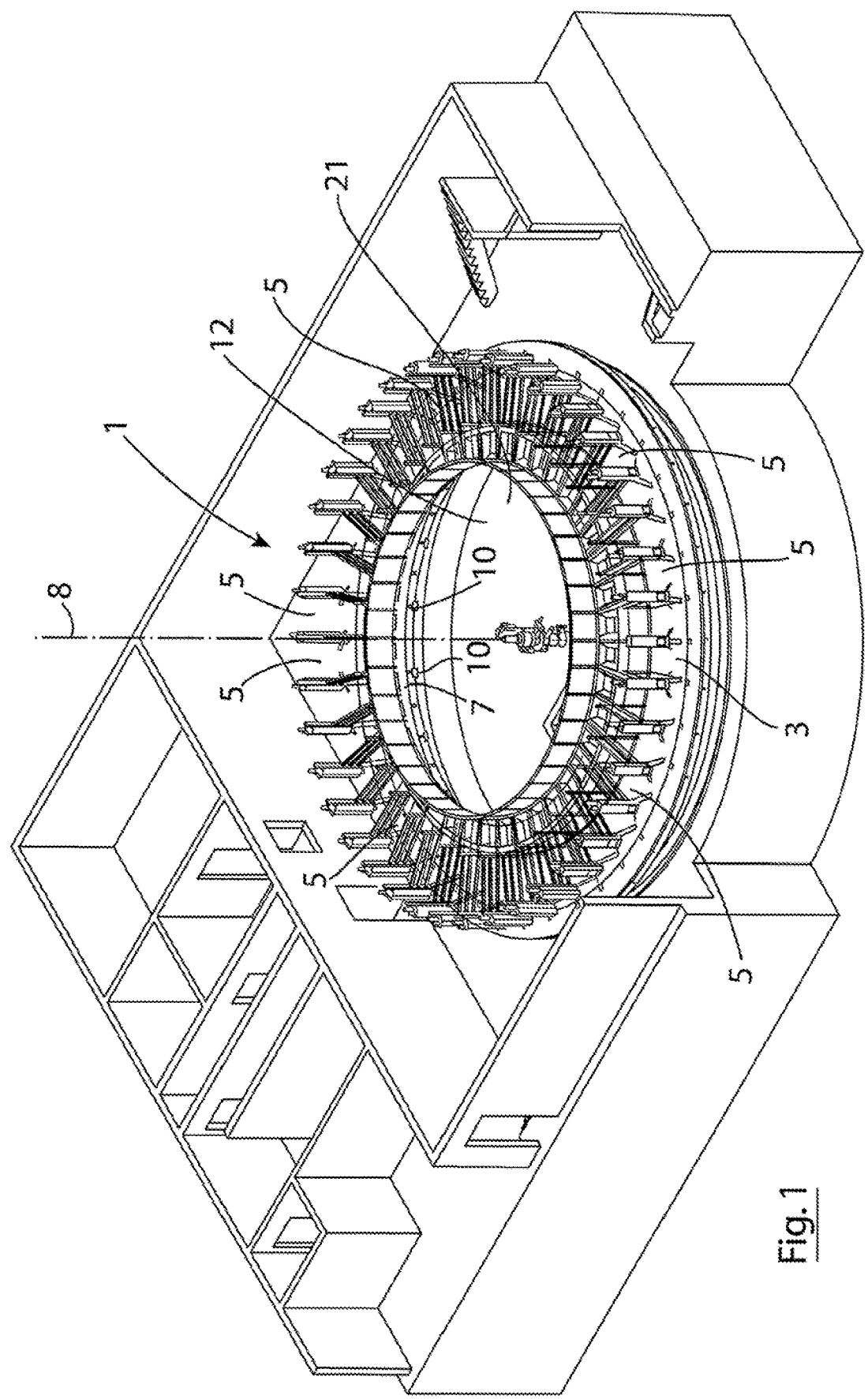

which extends in the direction of motion of the beam (7) in order to facilitate tilting of the roller (35) to follow any non-horizontality of the under surface (38) of the beam (7). The tilt axis is located just below a line of contact (67) of the roller (35) with the under surface (38) of the beam (7) to minimise lateral movement of the roller relative to the beam (7) as the roller (35) tilts about the tilt axis.

20 Claims, 8 Drawing Sheets

(51) Int. Cl.
*F16B 9/00* (2006.01)
*F16C 19/50* (2006.01)
*F16C 13/00* (2006.01)

(56) References Cited

U.S. PATENT DOCUMENTS

2011/0087372 A1\* 4/2011 Seaton ................ A01J 5/0175
 700/245
2017/0318778 A1\* 11/2017 Kronekvist .............. A01K 1/12

FOREIGN PATENT DOCUMENTS

| WO | 2007/117162 A1 | 10/2007 |
| WO | 2015/167390 A1 | 11/2015 |

OTHER PUBLICATIONS

Written Opinion of the International Searching Authority for PCT/IE2018/000010 dated Dec. 5, 2018 (PCT/ISA/237).

\* cited by examiner

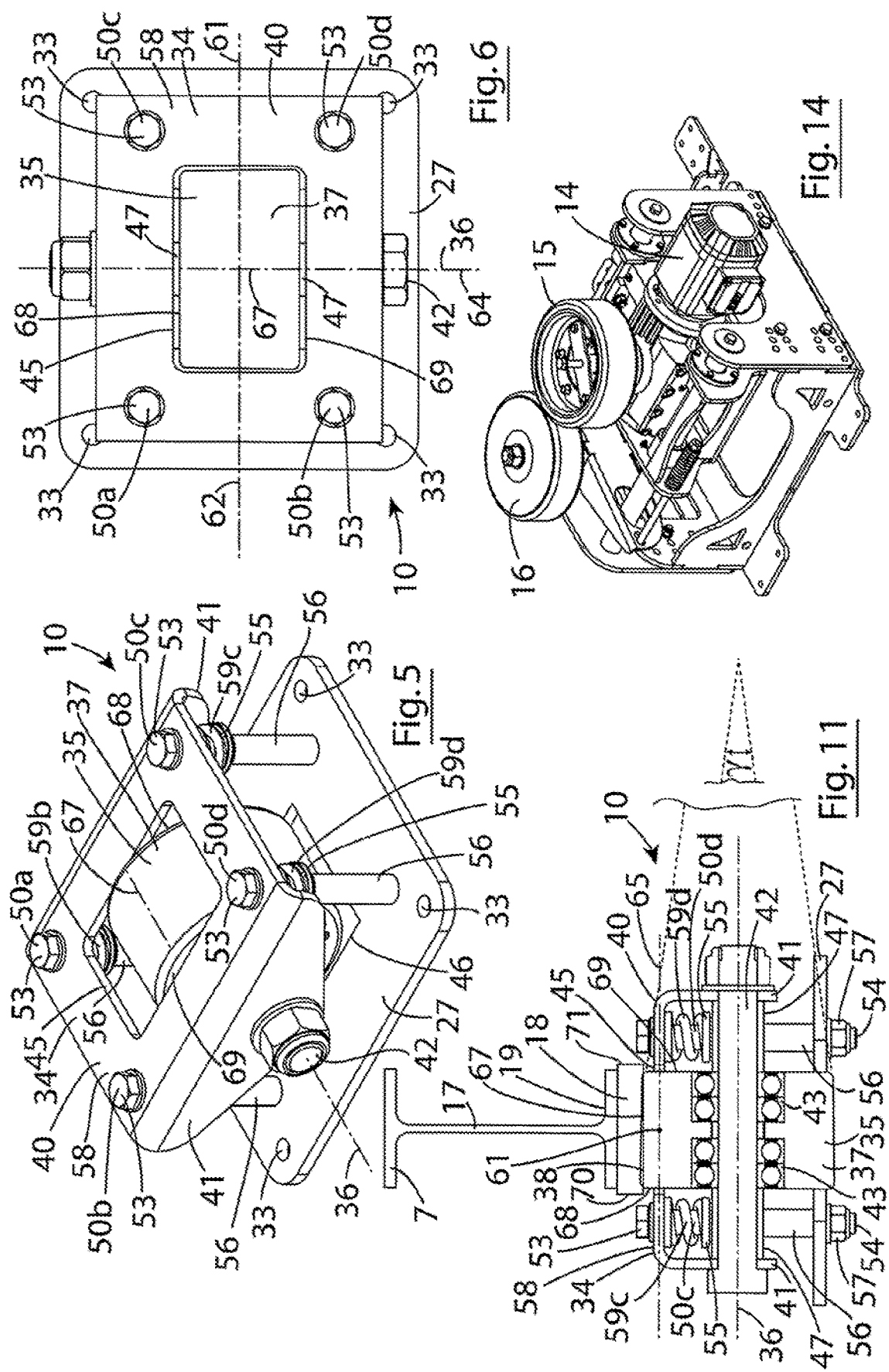

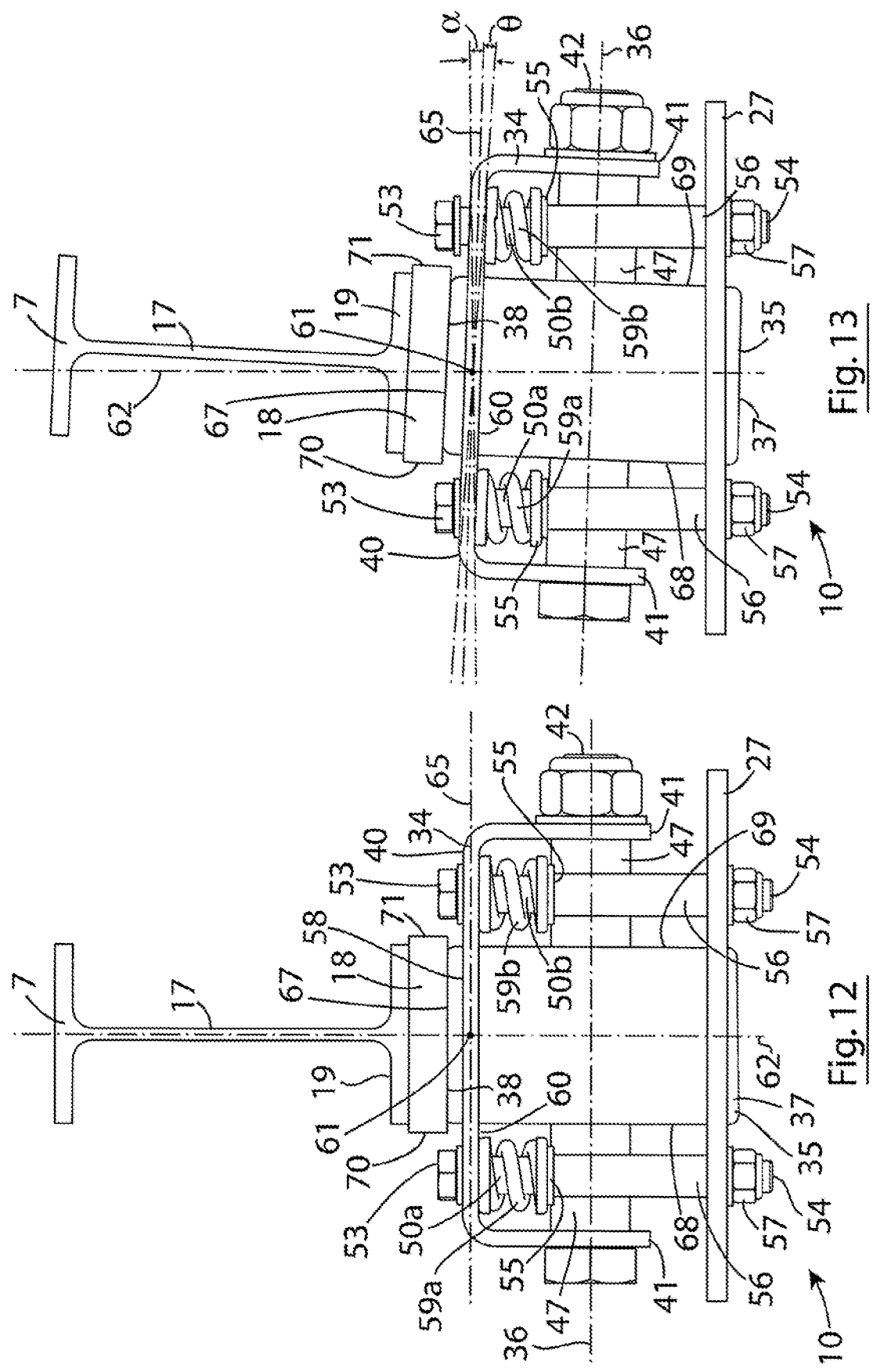

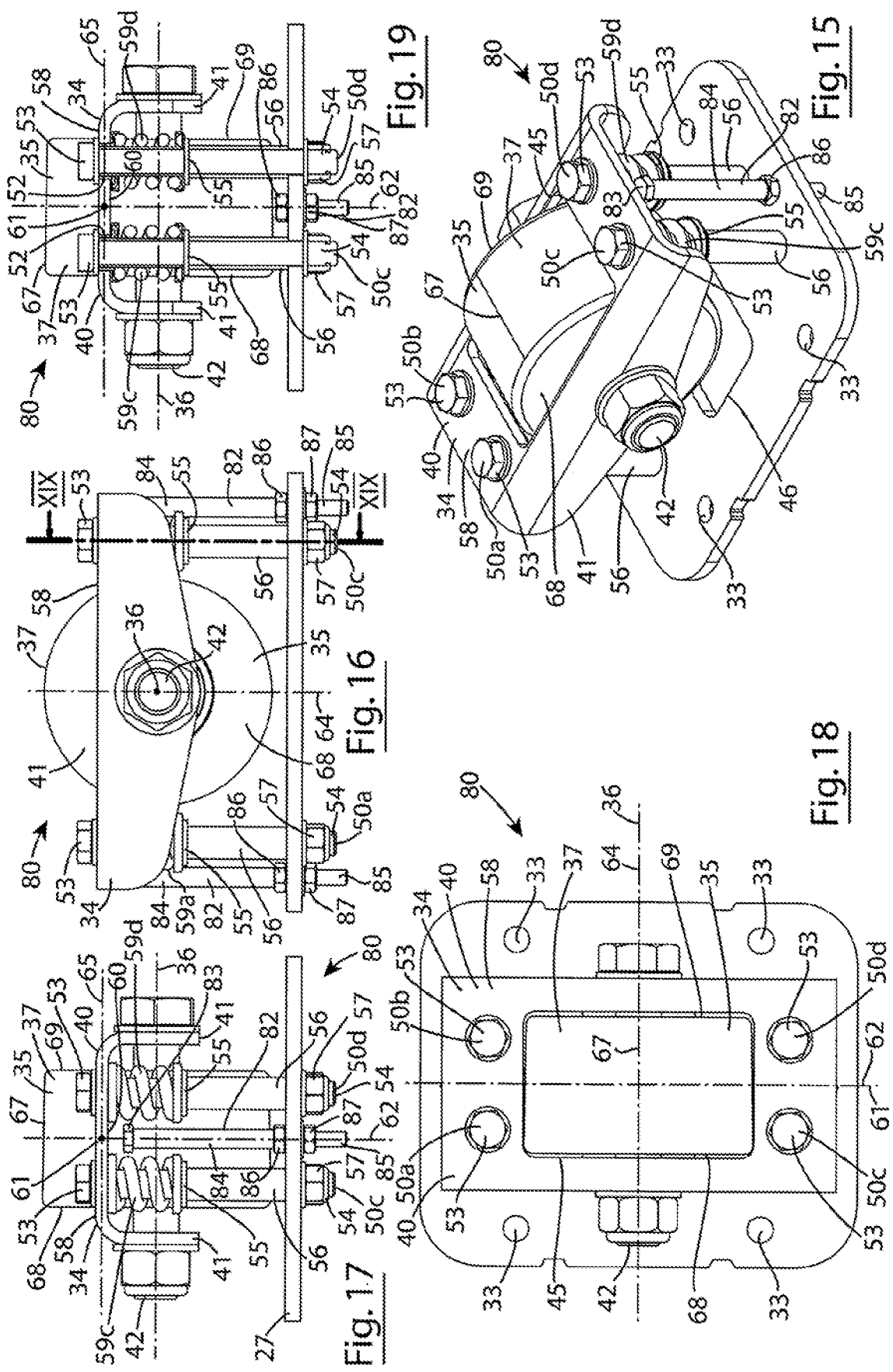

SUPPORT ELEMENT AND A METHOD FOR SUPPORTING AN ELONGATED BEAM, AND A ROTARY PLATFORM

CROSS REFERENCE TO RELATED APPLICATIONS

This application is a National Stage of International Application No. PCT/IE2018/000010 filed Sep. 12, 2018, claiming priority based on Irish Patent Application No. S2017/0180, filed Sep. 12, 2017

The present invention relates to a support element for supporting an elongated beam, and to a method for supporting an elongated beam. The invention also relates to a combination of a beam and the support element supporting the beam. Further, the invention relates to a rotary platform, and in particular, though not limited to a rotary milking platform.

Rotary platforms are used for many purposes, one such use is as a rotary milking platform, whereby a number of animals, for example, cows, goats and other such animals are milked. Such rotary milking platforms are provided with a plurality of animal accommodating locations, such as stalls arranged circumferentially around the platform. Animals sequentially enter the stalls as the platform rotates at a single entry point and sequentially exit the stalls at a single exit point, generally, adjacent the entry point after the platform has completed one complete revolution. The speed of the platform is set such that the time to complete one revolution of the platform is equal to or greater than the time required to milk each animal on the platform.

Such rotary milking platforms and other rotary platforms are supported for rotation on a plurality of freely rotatable rollers which are mounted on circumferentially spaced apart support elements. Typically, the support elements are mounted on the base of a pit within which the platform is rotatable. The rollers of the support elements rollably engage and support a circular beam, typically of I-shape cross-section which is secured to the underside of the platform. The circular beam defines a central axis of rotation of the platform. One or more circumferentially spaced apart drive motors rotate the circular beam around the central axis of rotation of the platform, for in turn rotating the platform. The one or more motors drive corresponding pairs of drive and pinch rollers, which engage a central web of the I-section circular beam therebetween for rotating the circular beam about the central axis of rotation of the platform. A lower horizontal web of the I-section circular beam sits on and engages the rollers. A wear plate may be located on the underside of the lower horizontal web which in turn sits on the rollers.

Unfortunately, due to the size of such rotary platforms, and in particular rotary milking platforms which may be of size to accommodate up to one hundred and twenty animals in one hundred and twenty respective stalls arranged circumferentially around the periphery of the platform, the lower web of the I-section circular beam may not always lie in a common horizontal plane. Parts of the circular beam may rise and fall around the circumferential length of the beam. Additionally, parts of the beam may not always extend vertically downwardly from the platform, thus resulting in the lower horizontal web or wear plate inclining at an angle to the horizontal. These imperfections in the circular beam result in the weight of the rotary platform not being supported equally on the respective support elements. This, in turn results in some of the rollers of the support elements bearing a greater proportion of the weight of the platform than the rollers of other ones of the support elements. This, leads to uneven wear of the rollers. Additionally, where the lower horizontal web or the wear plate of portions of the beam incline relative to the horizontal, only a part and typically an edge of the lower web or wear plate engages the adjacent roller. This, also leads to uneven wearing of the rollers. Any uneven wearing of the rollers reduces the life of the rollers, and thus, increases the frequency of maintenance and servicing required in order to maintain the rotary platform serviceable.

There is therefore a need for a support element for a rotary platform which addresses at least some of these problems. There is also a need for a support element for supporting a beam which addresses at least some of these problems. Furthermore, there is a need for a rotary milking platform in which servicing and maintenance are minimised.

The present invention is directed towards providing such a rotary platform, as well as a support element for a rotary platform and a support element for supporting a beam. Additionally, the invention is directed towards a method for supporting an elongated beam.

According to the invention there is provided a support element for supporting an elongated beam configured to move in its length direction, the support element comprising an anchor element for anchoring the support element, a carrier element mounted on the anchor element, a roller rotatably mounted on the carrier element about a rotational axis and defining a peripheral bearing surface configured for supporting and rollably engaging the beam on an underside thereof, wherein the carrier element is tiltably mounted on the anchor element about a tilt axis, the tilt axis being contained in a plane spaced apart above a plane containing the rotational axis of the roller.

Preferably, the plane containing the tilt axis is located adjacent or below a line of contact of the bearing surface of the roller with the beam.

In one aspect of the invention the plane containing the tilt axis is located at a level not more than seventy-five percent of the length of the radius of the bearing surface of the roller below the line of contact of the bearing surface of the roller with the beam.

In another aspect of the invention the plane containing the tilt axis is located at a level not more than fifty percent of the length of the radius of the bearing surface of the roller below the line of contact of the bearing surface of the roller with the beam.

Preferably, the plane containing the tilt axis is located at a level not more than thirty percent of the length of the radius of the bearing surface of the roller below the line of contact of the bearing surface of the roller with the beam.

Advantageously, the plane containing the tilt axis is located at a level not more than twenty-five percent of the length of the radius of the bearing surface of the roller below the line of contact of the bearing surface of the roller with the beam.

Preferably, the plane containing the tilt axis is located at a level not more than fifteen percent of the length of the radius of the bearing surface of the roller below the line of contact of the bearing surface of the roller with the beam.

Advantageously, the plane containing the tilt axis is located at a level not more than ten percent of the length of the radius of the bearing surface of the roller below the line of contact of the bearing surface of the roller with the beam.

Ideally, the plane containing the tilt axis is located at a level not more than five percent of the length of the radius of the bearing surface of the roller below the line of contact of the bearing surface of the roller with the beam.

Most preferably, the plane containing the tilt axis is located at a level just below the line of contact of the bearing surface of the roller with the beam.

In one aspect of the invention the plane containing the tilt axis extends substantially horizontally.

In another aspect of the invention the tilt axis extends at an angle greater than zero degrees relative to a vertical plane containing the rotational axis of the roller.

Preferably, the angle at which the tilt axis extends relative to the vertical plane containing the rotational axis of the roller is greater than 45°. Advantageously, the angle at which the tilt axis extends relative to the vertical plane containing the rotational axis of the roller is greater than 60°. Ideally, the angle at which the tilt axis extends relative to the vertical plane containing the rotational axis of the roller is greater than 75°.

Most preferably, the tilt axis extends substantially orthogonally relative to the vertically extending plane containing the rotational axis of the roller.

In one aspect of the invention the tilt axis is contained in a vertical plane containing the tilt axis and bisecting the roller, the vertical plane containing the tilt axis being orthogonal to the vertical plane containing the rotational axis of the roller.

In another aspect of the invention the carrier element is resiliently mounted on the anchor element. Preferably, the resilient mounting of the carrier element on the anchor element is configured for accommodating the tilting of the carrier element about the tilt axis.

Advantageously, the resilient mounting of the carrier element on the anchor element is configured for permitting substantially vertical movement of the carrier element relative to the anchor element.

In one aspect of the invention the carrier element is resiliently mounted on the anchor element on at least two resilient mounting elements located spaced apart from each other in an axial direction relative to the rotational axis of the roller.

Preferably, the at least two resilient mounting elements are located on respective opposite sides of the vertical plane containing the tilt axis bisecting the roller. Advantageously, the at least two resilient mounting elements are located equi-distant from the vertical plane containing the tilt axis bisecting the roller on the respective opposite sides thereof.

In another aspect of the invention four spaced apart resilient mounting elements are provided in pairs, the resilient mounting elements of each pair being spaced apart from each other in the axial direction relative to the rotational axis of the roller, and the pairs of the resilient mounting elements being spaced apart transversely relative to the rotational axis of the roller and being located on respective opposite sides of the vertical plane containing the rotational axis of the roller.

Preferably, the pairs of the resilient mounting elements located on the respective opposite sides of the vertical plane containing the rotational axis of the roller are located equi-distant from the vertical plane containing the rotational axis of the roller on the respective opposite sides thereof.

Advantageously, the resilient mounting elements of each pair thereof are spaced apart from each other a distance greater than the axial length of the roller.

Ideally, the resilient mounting elements of each pair thereof are spaced apart from each other a distance less than the axial length of the roller.

Preferably, each resilient mounting element comprises a resilient member.

Advantageously, each resilient mounting element comprises a spring. Ideally, each resilient mounting element comprises a compression spring.

In one aspect of the invention a guide means extending from the anchor element cooperates with the carrier element for guiding the carrier element relative to the anchor element.

Preferably, the guide means is configured for controlling the tilting movement of the carrier element about the tilt axis. Advantageously, the guide means is configured to limit the tilting movement of the carrier element about the tilt axis between predefined positive and negative angular values.

In one embodiment of the invention the guide means comprises at least two guide elements extending from the anchor element and extending through corresponding guide bores in the carrier element, the guide elements being spaced apart from each other in the axial direction relative to the rotational axis of the roller.

Preferably, the at least two guide elements are located on respective opposite sides of the vertical plane containing the tilt axis bisecting the roller.

Advantageously, the at least two guide elements are located equi-distant from the vertical plane containing the tilt axis bisecting the roller on the respective opposite sides thereof.

In one aspect of the invention four of the guide elements extend from the anchor element spaced apart from each other and extend through corresponding guide bores in the carrier element, the guide elements being provided in pairs, the guide elements of each pair being spaced apart from each other in the axial direction relative to the rotational axis of the roller, and the pairs of the guide elements being spaced apart transversely relative to the rotational axis of the roller and being located on the respective opposite sides of the vertical plane containing the rotational axis of the roller.

Preferably, the guide elements of each pair thereof are equi-distant from the vertical plane containing the tilt axis bisecting the roller.

Advantageously, the pairs of the guide elements are located equi-distant from the vertical plane containing the rotational axis of the roller on the opposite sides thereof.

In one aspect of the invention the guide elements are located adjacent corresponding ones of the resilient mounting elements.

In another aspect of the invention the guide elements extend through the respective corresponding resilient mounting elements. Preferably, the guide elements extend substantially coaxially with the respective corresponding resilient mounting elements.

In one aspect of the invention the carrier element substantially defines a plane containing the tilt axis. Preferably, the carrier element comprises a carrier plate.

In another aspect of the invention a pair of spaced apart side members extend downwardly from the carrier element for rotatably carrying the roller about the rotational axis. Preferably, a shaft defining the rotational axis of the roller is carried in the carrier element. Advantageously, the roller is rotatably mounted on the shaft.

In one aspect of the invention the support element is configured to support a beam moving in its length direction with rectilinear motion.

In another aspect of the invention the roller comprises a cylindrical roller with the bearing surface thereof extending substantially parallel to the rotational axis of the roller.

In an alternative aspect of the invention the support element is configured to support a beam moving in its length direction along an arcuate path about a centre of radius.

Preferably, the roller comprises a tapering roller defining a tapering bearing surface, the tapering bearing surface thereof tapering from one end of the roller of maximum diameter to the other end of the roller of minimum diameter.

In one aspect of the invention the bearing surface of the roller tapers in a direction towards the centre of radius of the arcuate path of the beam.

Preferably, the tapering angle of the bearing surface of the roller is selected so that if the roller were placed on a horizontal surface, and rolled along the horizontal surface, the roller would follow an arcuate path of radius similar to the radius of the arcuate path of movement of the beam.

Advantageously, the tapering angle of the bearing surface of the roller is such that the apex of the cone angle defined by the bearing surface of the roller coincides with the centre of radius of the arcuate path of the beam.

In one aspect of the invention the natural tangent of the cone angle defined by the bearing surface of the roller is approximately equal to the maximum diameter of the roller divided by the radius of the portion of the roller of maximum diameter from the centre of radius of the arcuate path of the beam.

In another aspect of the invention the tapering roller is of frusto-conical shape.

In one aspect of the invention at least one limit means for limiting excessive travel of the carrier element towards the anchor element is provided. Preferably, the at least one limit means extends from the anchor element for engaging the carrier element on excessive movement of the carrier element towards the anchor element.

Preferably, the roller is carried in the carrier element with the line of contact of the roller with the under surface of the beam lying in a plane defined by the under surface of the beam.

In another aspect of the invention the carrier element is adjustable for adjusting the orientation of the roller, so that the line of contact of the bearing surface of the roller with the beam lies in a horizontal plane in the normal orientation of the roller prior to being engaged by the beam.

Preferably, the anchor element is configured for coupling to the ground. Advantageously, the anchor element is configured for coupling to the ground through a ground engaging mounting element.

In another aspect of the invention the anchor element is configured for adjustable mounting on the ground engaging mounting element for adjusting the orientation of the carrier element.

Preferably, the anchor element is coupled to the ground engaging mounting element by a plurality of threaded mounting bolts.

Advantageously, the anchor element is coupled to the ground engaging mounting elements by four spaced apart threaded mounting bolts for facilitating adjusting the orientation of the anchor element relative to the ground engaging mounting element.

The invention also provides in combination a beam and the support element according to the invention supporting the beam with the rotational axis of the roller extending substantially transversely of the beam, and the roller rollably engaging the beam.

Preferably, the tilt axis of the carrier element extends substantially parallel to the beam.

In one aspect of the invention a plurality of the support elements are provided spaced apart from each other along the beam for supporting the beam at spaced apart intervals along the length of the beam, and with the respective rollers thereof rollably engaging the beam.

In another aspect of the invention the beam comprises an arcuate beam, the beam being configured to move in an arc corresponding to the arc defined by the beam about a centre of radius defined by the beam.

In a further aspect of the invention the beam comprises a beam of circular shape.

In one aspect of the invention the beam is mounted on the underside of a rotary platform for supporting the platform with the beam defining a central axis of rotation about which the rotary platform is rotatable.

In another aspect of the invention the beam comprises a beam of I-shape cross-section.

The invention also provides a rotary platform comprising a platform, an elongated beam formed into a circular shape and mounted on the underside of the platform for supporting the platform, the carrier beam defining a central axis of rotation of the platform, and a plurality of support elements according to the invention supporting the beam, the support elements being located at circumferentially spaced apart intervals around the central axis of rotation of the platform and at spaced apart intervals along the beam, with the rollers of the respective support elements rollably engaging the beam.

Preferably, the beam comprises a beam of I-shape cross-section.

In one aspect of the invention a wear plate is located on the underside of the beam for engaging the rollers of the support elements. Preferably, the wear plate comprises a wear plate of hardened material. Advantageously, the wear plate comprises a wear plate of hardened steel material.

The invention further provides a rotary platform comprising a platform, an elongated carrier beam formed into a circular shape and mounted on the underside of the platform for supporting the platform, the carrier beam defining a central axis of rotation of the platform and being supported on a plurality of support element located at circumferentially spaced apart intervals around the central axis of rotation of the platform beneath the carrier beam, each support element comprising an anchor element for anchoring the support element, a carrier element mounted on the anchor element, a roller rotatably mounted on the carrier element about a rotational axis and defining a peripheral bearing surface configured for supporting and rollably engaging the carrier beam on an underside thereof, wherein the carrier element of each support element is tiltably mounted on the corresponding anchor element about a tilt axis, the tilt axis being contained in a plane spaced apart above a plane containing the rotational axis of the roller thereof.

In one aspect of the invention the rollers of the respective support elements are rollably engageable with one of the underside of the carrier beam or the underside of a wear plate secured to the underside of the carrier beam.

In another aspect of the invention the carrier beam comprises a beam of I-shape cross-section.

Preferably, a top web and a bottom web of the carrier beam extend substantially horizontally.

In one aspect of the invention the rotary platform comprises a platform configured as a rotary milking platform.

The invention further provides a method for supporting an elongated beam, the beam being moveable in its lengths direction, the method comprising supporting the beam on at least one roller rotatable about a rotational axis extending substantially transversely of the beam, and tiltable about a tilt axis extending substantially parallel to the beam, the tilt axis being contained in a plane spaced apart above a plane containing the rotational axis of the roller.

In one aspect of the invention the roller is rotatably mounted in a carrier element of a support element, and the carrier element is resiliently mounted on the anchor element of the support element.

Preferably, the beam is supported on a plurality of the rollers spaced apart along the length direction of the beam.

The advantages of the invention are many. A particularly important advantage of the invention is that it provides a rotary platform, as well as a rotary milking platform in which maintenance and servicing of the rotary platform is minimised. By virtue of the fact that the rollers are resiliently mounted, the rollers follow any out-of-plane areas of the beam, which result in the surface of the beam in engagement with the rollers rising and falling relative to a horizontal plane of the beam as the platform rotates.

By virtue of the fact that the rollers are tiltably mounted about a tilt axis extending in the direction of movement of the beam, the rollers tilt about the tilt axis to follow any inclination relative to the horizontal of any portion of the beam so that the line of contact of each roller with the beam extends the length of the bearing surface of the roller or substantially the length of the bearing surface of the roller, thereby avoiding uneven wear of the rollers.

By virtue of the fact that the tilt axis about which each roller tilts is contained in a plane spaced apart above a plane containing the rotational axis of the roller, any frictional drag on the rollers along the line of contact of the rollers with the beam in a direction transversely of the beam, as the rollers tilt to accommodate inclined portions of the under surface of the beam is minimised, thereby further avoiding or minimising uneven wear of the roller. The more the tilt axis of each roller is raised above the plane containing the rotational axis of the roller towards the line of contact of the roller with the beam the more the frictional drag along the line of contact of the roller with the beam in a direction transversely of the beam is reduced. By configuring the tilt axis of each roller to be adjacent the line of contact of the roller with the beam, the frictional drag on the roller along the line of contact of the roller with the beam as the roller tilts is substantially eliminated. By providing the tilt axis to be within a distance below the line of contact of the roller with the beam equal to approximately half the radius of the roller, the frictional drag between the roller and the beam is minimal.

Figure 2:
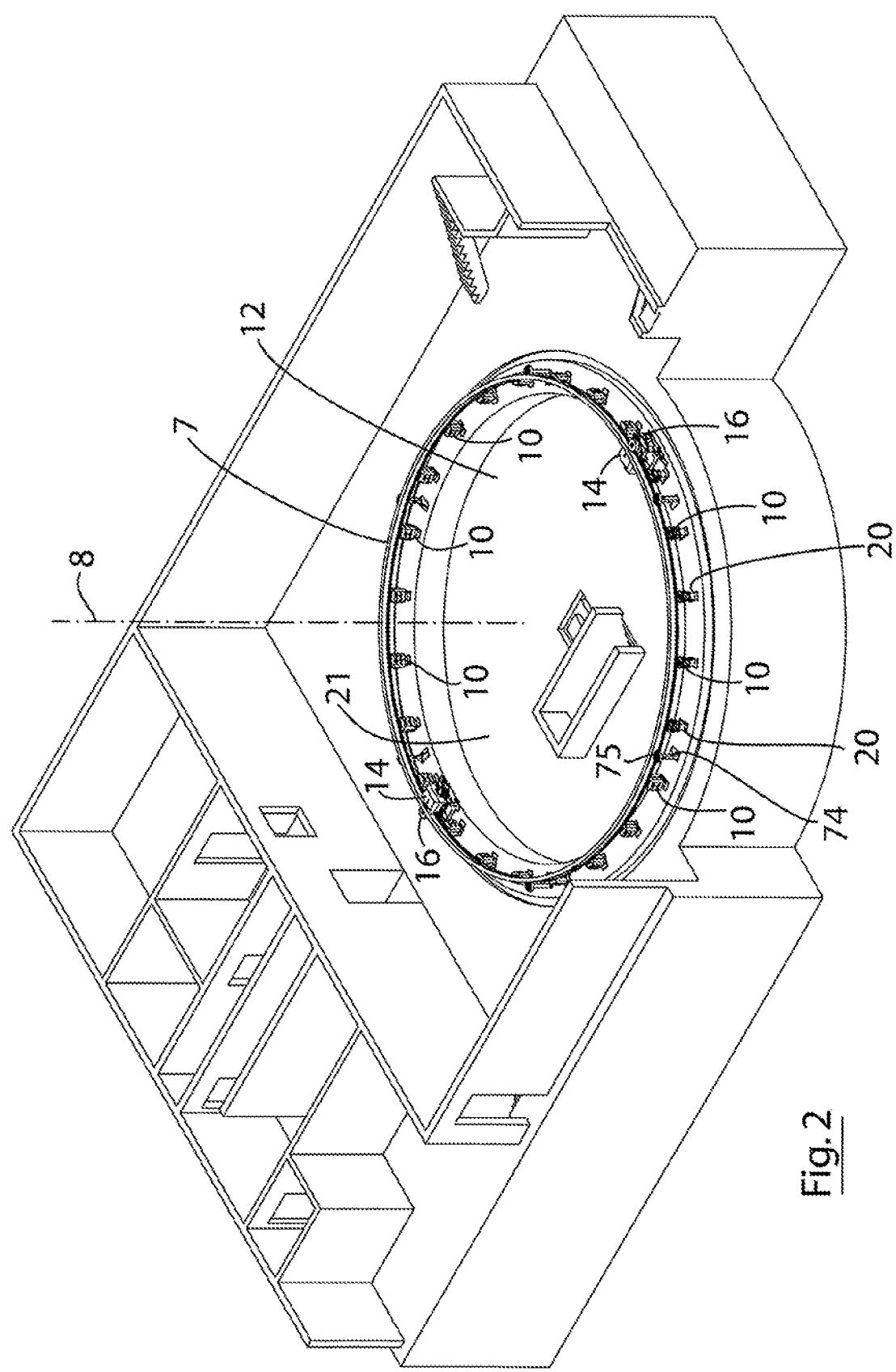
Figure 3:
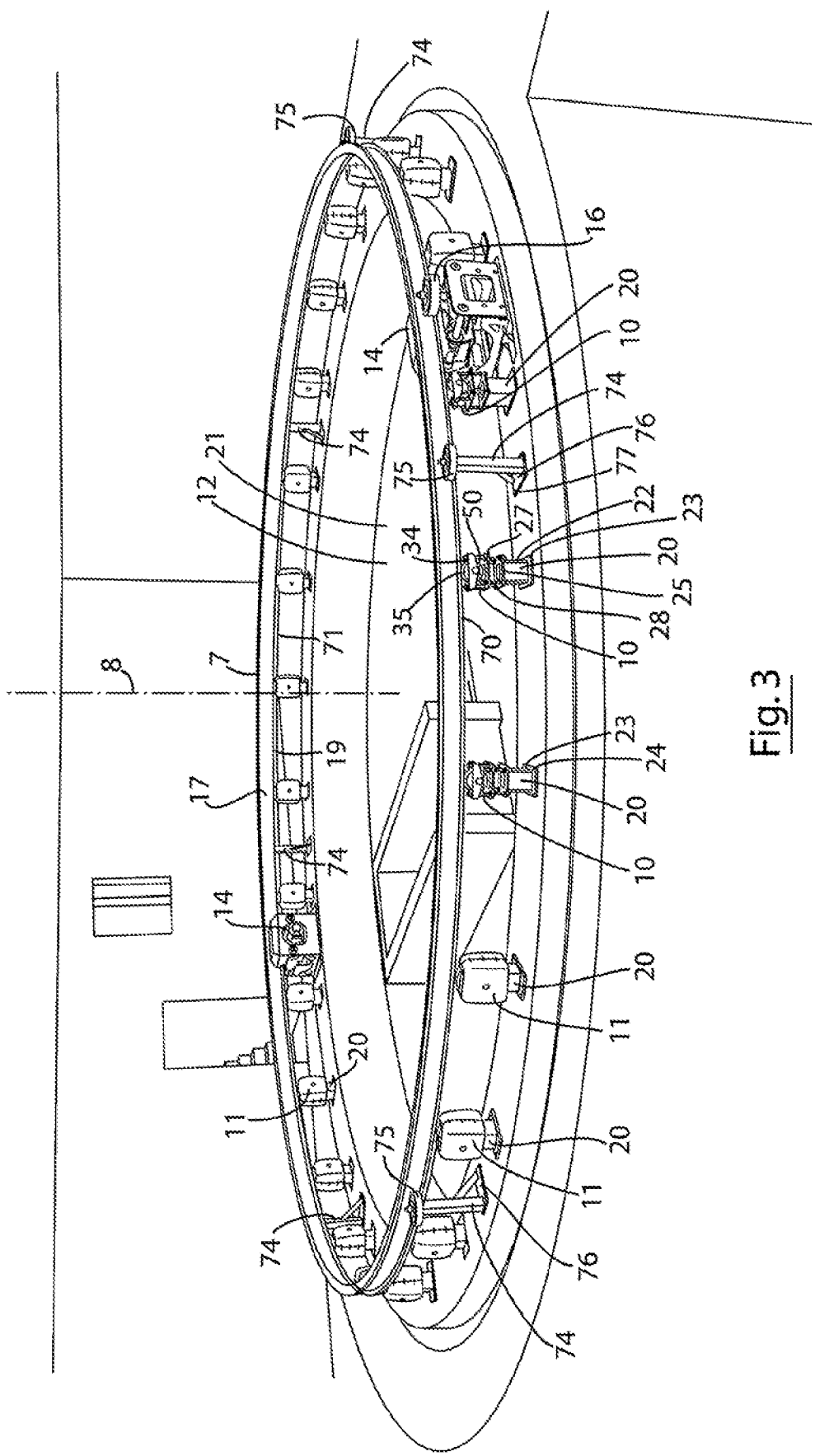
Figure 4:
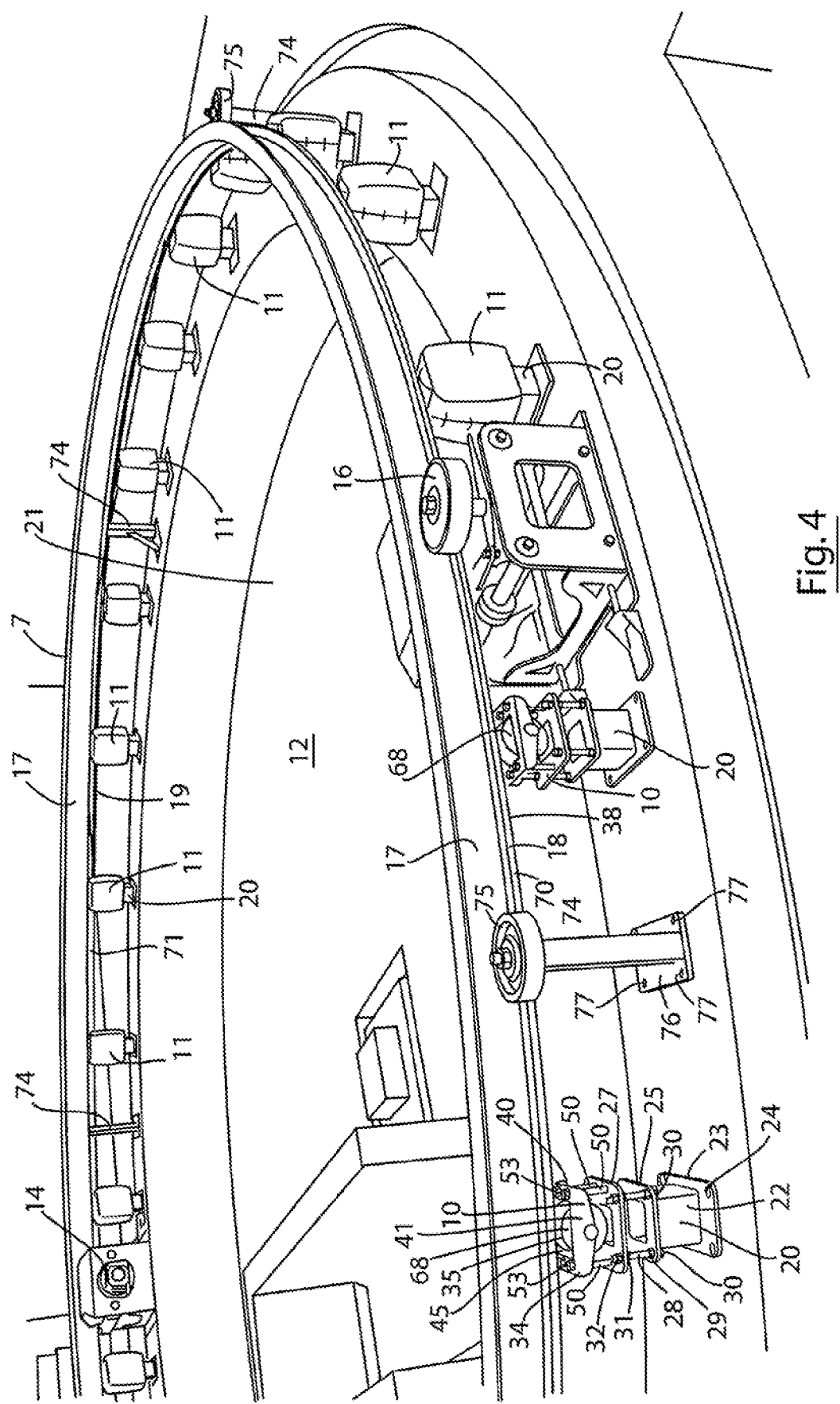
Figure 7:
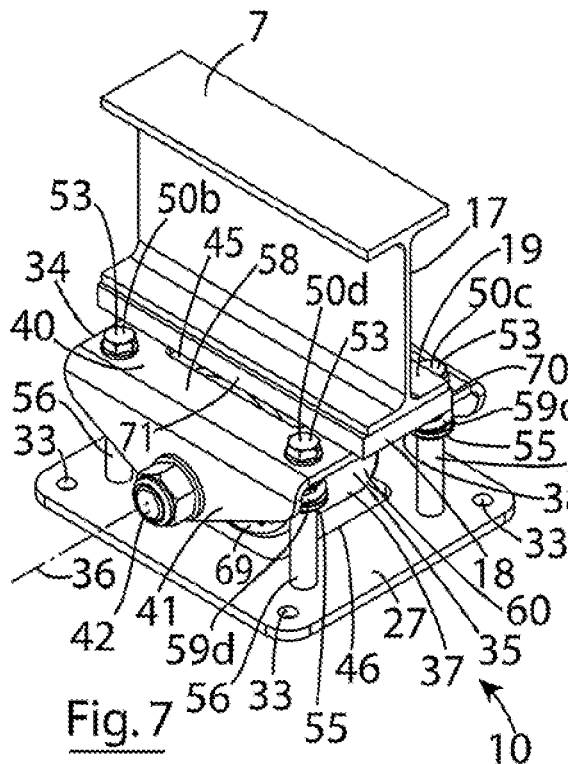
Figure 8:
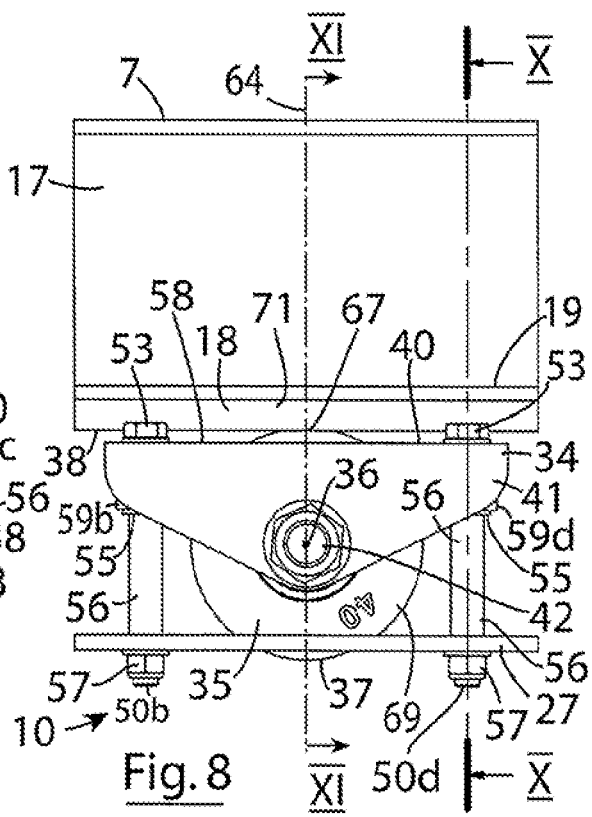
Figure 9:
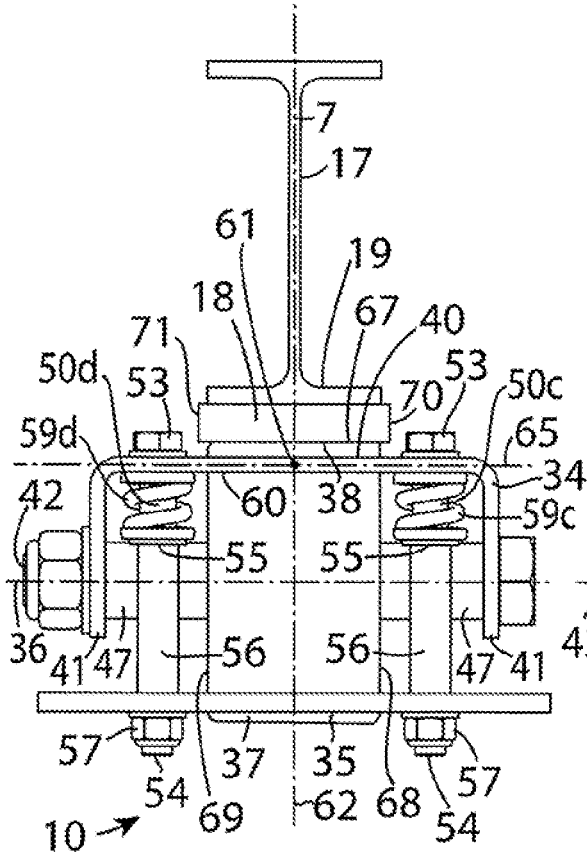
Figure 10:
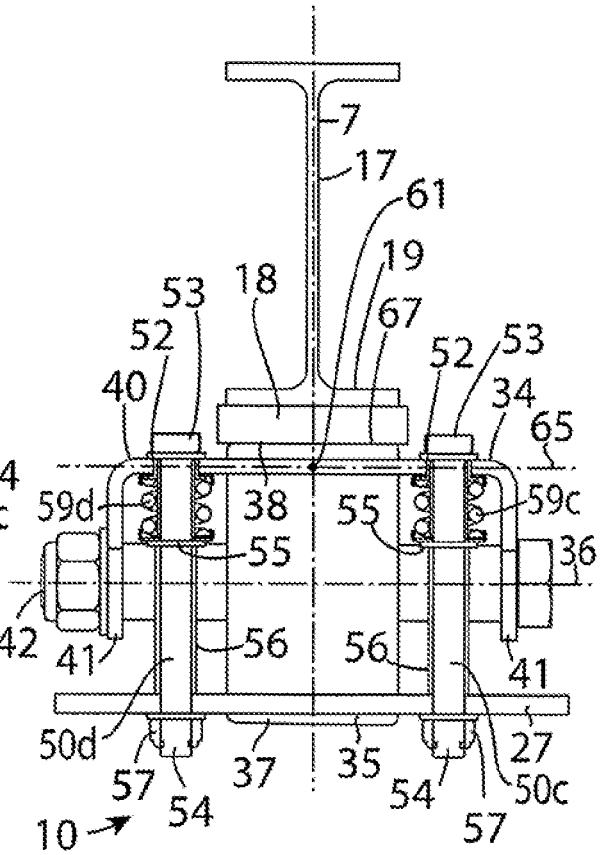

The invention will be more clearly understood from the following description of some preferred embodiments thereof which are given by way of example only with reference to the accompanying drawings, in which:

FIG. 1 is a perspective view of a rotary milking platform according to the invention, FIG. 2 is a perspective view of a portion of the rotary milking platform of FIG. 1, FIG. 3 is an enlarged perspective view of the portion of FIG. 2 of the milking platform of FIG. 1, FIG. 4 is an enlarged perspective view of a part of the portion of FIG. 2 of the milking platform of FIG. 1, FIG. 5 is a perspective view of a support element also according to the invention for use in the rotary milking platform of FIG. 1, FIG. 6 is a top plan view of the support element of FIG. 5, FIG. 7 is another perspective view of the support element of FIG. 5 illustrated supporting a portion of the rotary milking platform of FIG. 1, FIG. 8 is a side elevational view of the support element of FIG. 5 illustrated supporting a portion of the rotary milking platform of FIG. 1, FIG. 9 is an end elevational view of the support element of FIG. 5 illustrated supporting a portion of the rotary milking platform of FIG. 1, FIG. 10 is a transverse cross-sectional end elevational view of the support element of FIG. 5 illustrated supporting a portion of the rotary milking platform on the line X-X of FIG. 8, FIG. 11 is a transverse cross-sectional end elevational view of the support element of FIG. 5 illustrated supporting a portion of the rotary milking platform of FIG. 1 on the line XI-XI of FIG. 8, FIG. 12 is an enlarged end elevational view of the support element of FIG. 5 illustrated supporting a portion of the rotary milking platform of FIG. 1, FIG. 13 is a view similar to FIG. 12 but with the portion of the rotary milking platform of FIG. 1 non-horizontal, FIG. 14 is a perspective view of another portion of the rotary milking platform of FIG. 1, FIG. 15 is a perspective view of a support element according to another embodiment of the invention for use in a rotary milking platform substantially similar to the rotary milking platform of FIG. 1, FIG. 16 is a side elevational view of the support element of FIG. 15, FIG. 17 is an end elevational view of the support element of FIG. 15, FIG. 18 is a top plan view of the support element of FIG. 15, and FIG. 19 is a cross-sectional end elevational view of the support element of FIG. 15 on the line XIX-XIX.

Referring to the drawings, and initially to FIGS. 1 to 14, there is illustrated a rotary platform according to the invention, in this case a rotary milking platform indicated generally by the reference numeral 1. The rotary milking platform 1 is suitable for milking animals in a milking cycle. A milking cycle for each animal commences as the animal enters the platform and terminates when the platform has completed almost one complete revolution from the time the animal enters the platform. Such rotary milking platforms will be well known to those skilled in the art.

The rotary milking platform 1 comprises a platform 3 which defines a plurality of animal accommodating locations, namely, stalls 5 for accommodating the animals being milked as the rotary milking platform 1 rotates. A carrier beam 7 of I-shape transverse cross-section is shaped to form a circular track and is rigidly secured to the platform 3 on the underside thereof for supporting the platform 3. The carrier beam 7 defines a centre of radius, and in turn defines a central axis of rotation 8 about which the platform 3 rotates during the milking process. The central axis of rotation 8 about which the platform 3 rotates coincides with the centre of radius defined by the carrier beam 7.

A plurality of support elements also according to the invention and indicated generally by the reference numeral 10 are located beneath the carrier beam 7 and are spaced apart circumferentially around the central axis of rotation 8 of the platform 3 for supporting and rollably engaging the carrier beam 7 at circumferentially spaced apart intervals along the carrier beam 7, as will be described in detail below. Typically, the support elements 10 are located in a pit 12 beneath the platform 3. In FIGS. 3 and 4 some of the support elements 10 are illustrated housed in respective housing 11. In practice, all the support elements 10 will be housed in respective ones of the housings 11.

A drive means in this embodiment of the invention a pair of drive motors 14 located in the pit 12 rotate the platform 3 about the central axis of rotation 8. The drive motors 14 are spaced apart circumferentially around the central axis of rotation 8 of the platform 3 at 180° intervals. Each drive motor 14 drives a corresponding drive roller 15 which co-operates with a corresponding pinch roller 16. Each drive roller 15 and its corresponding pinch roller 16 are located on respective opposite sides of the carrier beam 7 and engage a central web 17 of the carrier beam 7 for transmitting drive from the corresponding drive motor 14 to the carrier beam 7 to rotate the platform 3 about the central axis of rotation 8.

A wear plate 18 of a hardened steel material is secured to a lower web 19 on the underside of the carrier beam 7 for engaging the respective support elements 10.

Each support element 10 comprises a ground engaging mounting element 20 which is configured for securing the support element 10 to a base 21 of the pit 12. Each ground engaging mounting element 20 comprises a central member 22 of box-section steel extending upwardly from a ground engaging plate 23, which is secured to the base 21 of the pit 12 by masonry bolts 24. The central member 22 terminates at its upper end in an upper mounting plate 25.

An anchor element of each support element 10 comprises an anchor plate 27 which is adjustably secured to the upper mounting plate 25 of the ground engaging mounting element 20 by four spaced apart threaded mounting bolts 28 for facilitating adjustment of the anchor plate 27, and in turn the support element 10 relative to the ground engaging mounting element 20 for a purpose to be described below. The mounting bolts 28 are secured to the upper mounting plate 25 of the ground engaging mounting element 20 by nuts 29 with the upper mounting plate 25 clamped between the nuts 29 and heads 30 of the mounting bolts 28. The mounting bolts extend through bores 33 in the anchor plate 27, and nuts 31 and 32 on the mounting bolts 28 adjustably clamp the anchor plate 27 onto the mounting bolts 28.

A carrier element 34 of each support element 10 is carried on the anchor plate 27 as will be described below and rotatably carries a freely rotatable roller 35 about a rotational axis 36 which extends substantially transversely relative to the carrier beam 7. The roller 35 is of steel and defines a peripheral bearing surface 37 which rollably engages an under surface 38 of the wear plate 18 of the carrier beam 7, as the carrier beam 7 with the platform 3 is rotated about the central axis of rotation 8 of the platform 3. The carrier element 34 comprises a carrier plate 40 having a pair of downwardly extending side members 41 which carry a shaft 42 on which the roller 35 is rotatably mounted on a pair of bearings 43. A central opening 45 in the carrier plate 40 accommodates the roller 35 therein. A pair of spacer sleeves 47 between the bearings 43 and the respective side members 41 centre the roller 35 between the side members 41 and in the central opening 45 of the carrier plate 40. A central opening 46 extending through the anchor plate 27 accommodates the roller 35 in the anchor plate 27.

Guide means for guiding downward and upward movement of the carrier plate 40 relative to the anchor plate 27 comprises four spaced apart guide elements, in this embodiment of the invention four spaced apart guide bolts 50 which extend upwardly from the anchor plate 27 through corresponding guide bores 52 in the carrier plate 40. The guide bolts 50 terminate at their upper ends in heads 53 and at their lower ends in threaded ends 54. Abutment washers 55 are welded to the guide bolts 50 at locations spaced apart from the corresponding heads 53 thereof. Spacer sleeves 56 located on the guide bolts 50 extend from the abutment washers 55 towards the threaded ends 54. Nuts 57 on the threaded ends 54 secure the guide bolts 50 to the anchor plate 27, with the anchor plate 27 securely retained and clamped between the nuts 57 and the corresponding spacer sleeves 56, with the spacer sleeves 56 abutting the abutment washers 55. The heads 53 of the guide bolts 50 engage an upper surface 58 of the carrier plate 40 and limit upward movement of the carrier plate 40 relative to the anchor plate 27.

Resilient mounting means, namely, resilient mounting elements, in this embodiment of the invention compression springs 59 are located on and co-axial with the corresponding guide bolts 50 and act between the corresponding abutment washers 55 and an under surface 60 of the carrier plate 40 and resiliently urge the carrier plate 40 into engagement with the heads 53 of the guide bolts 50. The compression springs 59 facilitate vertical downward and upward movement of the carrier plate 40, and in turn the roller 35 for accommodating rising and falling of the carrier beam 7 as the carrier beam 7 rotates with the platform 3 about the central axis of rotation 8 of the platform 3.

Additionally, the compression springs 59 of each support element 10 facilitate tilting movement of the carrier plate 40 and in turn the roller 35 about a tilt axis 61 which extends substantially parallel to the carrier beam 7, as will be described below, for accommodating non-horizontality of the under surface 38 of the wear plate 18 as the carrier beam 7 rotates about the central axis of rotation 8 of the platform 3. In this embodiment of the invention the compression springs 59 are substantially identical to each other and are of substantially identical resilience, and the spacing between the abutment washers 55 and the heads 53 of the guide bolts 50 is substantially similar, so that the force applied to the carrier plate 40 by each of the springs 59 for urging the carrier plate 40 into engagement with the corresponding head 53 of the guide bolts 50 is substantially similar when the carrier plate 40 is abutting the heads 53 of the guide bolts 50.

In this embodiment of the invention the guide bolts 50 and in turn the compression springs 59 are located in pairs on respective opposite sides of a vertical plane 64 containing the rotational axis 36 of the roller 35, namely, the pair of guide bolts 50*a* and 50*b*, and the pair of guide bolts 50*c* and 50*d* are located on the respective opposite sides of the vertical plane 64. The pair of guide bolts 50*a* and 50*b* and the pair of guide bolts 50*c* and 50*d* are equi-distant from the vertical plane 64 on the respective opposite sides thereof. The guide bolts 50 of each pair 50*a* and 50*b*, and 50*c* and 50*d* thereof are located on respective opposite sides of a vertical plane 62 which contains the tilt axis 61 and bisects the roller 35 between its opposite ends 68 and 69. Each of the guide bolts 50*a*, 50*b*, 50*c* and 50*d* are equi-distant from the vertical plane 62 containing the tilt axis 61 and bisecting the roller 35. The springs 59*a*, 59*b*, 59*c* and 59*d* are similarly located equi-distant from the vertical plane 62 containing the tilt axis 61. Additionally, the springs 59*a*, 59*b*, 59*c* and 59*d* are located equi-distant from the vertical plane 64 containing the rotational axis 36 of the roller 35.

In this embodiment of the invention the spacing between the guide bolts 50*a* and 50*b* and the spacing between the guide bolts 50*c* and 50*d* in an axial direction relative to the rotational axis 36 of the roller 35 is greater than the axial length of the roller 35 between the opposite ends 68 and 69 thereof. Similarly, the spacing between the springs 59*a* and 59*b* and the spacing between the springs 59*c* and 59*d* in the axial direction relative to the rotational axis 36 of the roller 35 is greater than the axial length of the roller 35 between the opposite ends 68 and 69 thereof. Additionally, the spacing between the guide bolts 50*a* and 50*c* and the spacing between the guide bolts 50b and 50d is greater than the diameter of the roller 35. Similarly, the spacing between the springs 59a and 59c and the spacing between the springs 59b and 59d is also greater than the diameter of the roller 35.

The mounting of the carrier plate 40 on the anchor plate 27 by the guide bolts 50 and the compression springs 59 is configured so that the tilt axis 61 is located in a tilt plane 65 defined by the carrier plate 40, which in this embodiment of the invention is just below a line of contact 67 of the bearing surface 37 of the roller 35 with the under surface 38 of the wear plate 18 of the carrier beam 7. Additionally, by virtue of the fact that the carrier plate 40 is supported on the compression springs 59 at locations equi-distant on opposite sides of the central plane 62 which bisects the roller 35 the tilt axis 61 of the carrier plate 40 is located to lie substantially in the central plane 62, and thus substantially mid-way between opposite ends 68 and 69 of the roller 35. Accordingly, when the roller 35 is engaged by a portion of the under surface 38 of the wear plate 18 of the carrier beam 7 which is angled at a positive angle $\alpha$ or a negative angle $\theta$ to the horizontal, the roller 35 tilts about the tilt axis 61 to follow the angle of the under surface 38 of the wear plate 18. The action of the compression springs 59 on the carrier plate 40 ensures that the roller 35 along its line of contact 67 with the under surface 38 of the ware plate 18 remains in contact with the wear plate 18.

By virtue of the fact that the tilt axis 61 is contained in the tilt plane 65, which is just below the line of contact 67 of the bearing surface 37 of the roller 35 with the under surface 38 of the wear plate 18, the roller 35 tilts with the wear plate 18 with virtually no relative lateral movement between the roller 35 and the wear plate 18 in a direction transversely of the carrier beam 7, which would otherwise occur if the tilt axis were located lower down below the line of contact 67, for example, adjacent the rotational axis 36 of the roller 35, or indeed further down below the rotational axis 36 of the roller 35. The absence of or the minimisation of relative movement between the roller 35 and the wear plate 18 transversely relative to the wear plate 18 avoids or significantly minimises any frictional drag between the roller 35 and the wear plate 18, which would thus lead to wear of either or both of the bearing surface 37 of the roller 35 or the under surface 38 of the wear plate 18.

For example, if the tilt axis about which the roller 35 tilts to accommodate non-horizontality of the under surface 38 of the wear plate 18 were located at the level of the rotational axis 36 of the roller 35, the bearing surface 37 of the roller 35 adjacent the line of contact 67 with the under surface 38 of the wear plate 18 would have to pivot about the tilt axis adjacent the rotational axis 36, which would thus result in the bearing surface 37 of the roller 35 adjacent the line of contact 67 with the wear plate 18 moving transversely relative to the under surface 38 of the wear plate 18 as the roller 35 is tilted to accommodate non-horizontality of the under surface 38 of the wear plate 18. Furthermore, if the tilt axis about which the roller tilts were located further down below the rotational axis 36 of the roller 35, the transverse distance relative to the carrier beam 7 which the bearing surface 37 of the roller 35 adjacent the line of contact 67 with the wear plate 18 would have to move in order to accommodate any non-horizontality of the under surface 38 of the wear plate 18 would be even greater.

Accordingly, by locating the tilt axis 61 in a tilt plane 65 which is adjacent or just below the line of contact 67 of the bearing surface 37 of the roller 35 with the wear plate 18, when the roller 35 tilts to accommodate any non-horizontality of the under surface 38 of the wear plate 18, the tilting movement of the roller 35 occurs with either no transverse movement of the roller relative to the carrier beam 7, or with minimal transverse movement relative to the carrier beam 7. Accordingly, the closer the tilt plane 65 containing the tilt axis 61 of the carrier plate 40, and in turn of the roller 35, is to the line of contact 67 of the bearing surface 37 of the roller 35 with the wear plate 18, the less will be the transverse movement of the roller relative to the carrier beam 7 as the roller 35 tilts to accommodate any non-horizontality of the under surface 38 of the wear plate 18 of the carrier beam 7.

The guide bores 52 extending through the carrier plate 40 are of diameter sufficiently greater than the diameter of the guide bolts 50 to permit tilting of the carrier plate 40 about the tilt axis 61, in order to permit sufficient tilting of the roller 35 about the tilt axis 61 to follow any non-horizontality of the under surface 38 of the wear plate 18 as the platform 3 rotates about the central axis of rotation 8, while at the same time the diameter of the guide bores 52 in the carrier plate 40 relative to the diameter of the guide bolts 50 is such as to avoid or minimise any lateral movement of the carrier plate 40, and in turn the roller 35 transversely relative to the under surface 38 of the wear plate 18.

In this embodiment of the invention in order to maintain the surface speed of the roller 35 along the line of contact 67 of the roller 35 with the under surface 38 of the wear plate 18 matched with the surface speeds of the under surface 38 of the wear plate 18 across the width of the wear plate 18, and to therefore avoid relative slipping of the bearing surface 37 of the roller 35 relative to the under surface 38 of the wear plate 18 along the line of contact 67, the roller 35 comprises a tapering roller of frusto-conical shape which tapers in a direction towards the central axis of rotation 8 of the platform 3 from the end 68 of the roller 35 of maximum diameter to the end 69 of the roller 35 of minimum diameter.

The tapering cone angle $\gamma$ of the bearing surface 37 of the roller 35 is such that if the roller 35 were placed on a horizontal surface, the roller 35 would roll along the horizontal surface in an arc of radius similar to the radius of the carrier beam 7 from the central axis of rotation 8 of the platform 3. Therefore, the apex of the cone angle $\gamma$ defined by the tapering bearing surface 37 of the roller 35 coincides with the central axis of rotation 8 of the platform 3. It is believed that the natural tangent of the cone angle $\gamma$ defined by the bearing surface 37 of the roller 35 is approximately equal to the maximum diameter of the roller 35 adjacent the end 68 of the roller which is most remote from the central axis of rotation 8 divided by the radius of the end 68 of the roller 35 from the central axis of rotation 8.

By virtue of providing the roller 35 as a tapering roller as just described, there is no slipping of the bearing surface 37 of the roller 35 relative to the under surface 38 of the wear plate 18 along the line of contact 67 of the bearing surface 37 of the roller 35 with the under surface 38 of the wear plate 18. This is due to the fact that the linear speeds of the bearing surface 37 of the roller 35 along the line of contact 67 of the bearing surface 37 of the roller 35 with the under surface 38 of the wear plate 18 are matched with the corresponding linear speeds of the under surface 38 of the wear plate 18 along the line of contact 67 of the bearing surface 37 of the roller 35 with the under surface 38 of the wear plate 18 from an outer edge 70 of the wear plate 18 to an inner edge 71 thereof.

The shaft 42 of the roller 35 of each support element 10 is mounted in the side members 41 of the carrier element 34 to incline downwardly in a direction away from the central axis of rotation 8, so that the rotational axis 36 of the roller 35 inclines downwardly away from the central axis of rotation 8 at an angle equal to half the cone angle γ of the roller 35, in order that when the carrier plate 40 is urged against the heads 53 of the guide bolts 50, and is lying in a horizontal plane, the line of contact 67 of the bearing surface 37 of the roller 35 along which the roller 35 engages the under surface 38 of the wear plate 18 lies in a horizontal plane.

A plurality of ground engaging carrier brackets 74 are spaced apart circumferentially around the carrier beam 7, and retaining rollers 75 freely rotatably carried on the respective carrier brackets 74 rollably engage the central web 17 of the carrier beam 7 for retaining the carrier beam 7 in alignment with the rollers 35 of the respective support elements 10. Each carrier bracket 74 comprises a ground engaging plate 76 which is secured to the base 21 of the pit 12 by masonry bolts 77.

In use, initially the support elements 10 are located in the pit 12 on the base 21 thereof at suitably circumferentially equi-spaced apart locations around the central axis of rotation 8 of the platform 3 for supporting the carrier beam 7, and with the rotational axes 36 of the rollers 35 radiating in a direction outwardly from the central axis of rotation 8 of the platform 3, and with the apices of the cone angle γ of the respective rollers 35 substantially coinciding with the central axis of rotation 8 of the platform 3. The ground engaging plates 23 of the ground engaging mounting elements 20 are secured to the base 21 of the pit 12 by the masonry bolts 24.

The orientation of the anchor plates 27 relative to the ground engaging mounting elements 20 is adjusted, for in turn adjusting the angle of rotational axes 36 of the corresponding rollers 35 relative to the horizontal, so that firstly the rollers 35 are oriented with the lines of contact 67 of the bearing surfaces 37 of the rollers 35 where the bearing surfaces 37 of the rollers 35 make contact with the under surface 38 of the wear plate 18 lying in a horizontal plane in their normal positions with the compression springs 59 urging the carrier plates 40 into tight abutment engagement with the heads 53 of the guide bolts 50, prior to the carrier beam 7 being placed on the mounting elements 10, and secondly, so that the lines of contact 67 of the bearing surfaces 37 of the respective rollers 35 all lie in a common horizontal plane prior to supporting the carrier beam 7. The adjustment of the anchor plates 27 relative to the corresponding ground engaging mounting elements 20 is carried out by adjusting the positions of the nuts 31 and 32 along the threaded mounting bolts 28, for in turn adjusting the orientation of the anchor plates 27 relative to the corresponding ground engaging mounting elements 20.

On completion of the adjustment of the orientation of the carrier plates 40 relative to the ground engaging mounting elements 20 for aligning the lines of contact 67 of the bearing surfaces 37 of the rollers 35 in a common horizontal plane, the platform 3 with the carrier beam 7 secured to the underside thereof is put in place with the carrier beam 7 supported on the rollers 35 of the support elements 10 and with the rollers 35 rollably engaging the under surface 38 of the wear plate 18 of the carrier beam 7 along the respective lines of contact 67. With the platform 3 and the carrier beam 7 so supported on the mounting elements 10, the rotary platform 1 is ready for use.

As the platform 3 is rotated about the central axis of rotation 8 by the drive motors 14 through the drive and pinch rollers 15 and 16, the carrier beam 7 is supported on the rollers 35 of the support elements 10. As the carrier beam 7 rises and falls during rotation of the platform 3 as a result of imperfections in the platform 3, the carrier beam 7 or the wear plate 18, the rollers 35 by virtue of the resilient mounting of the carrier plate 40 on the compression springs 59 rise and fall with the wear plate 18, thereby maintaining an even distribution of the weight of the platform 3 on the rollers 35 of the support elements 10. Additionally, as the rollers 35 of the support elements 10 encounter a portion of the under surface 38 of the wear plate 18 which is at an angle α or θ off-horizontal, the compression springs 59 accommodate tilting of the carrier plates 40 about the respective tilt axes 61, and in turn tilting of the rollers 35 about the tilt axes 61 thereof, so that the bearing surfaces 37 of the rollers 35 adjacent the lines of contact 67 thereof with the wear plate 18 tilt through the relevant corresponding tilt angle α or θ of the under surface 38 of the wear plate 18. In this way the bearing surfaces 37 of the rollers 35 remain in contact with the under surfaces 38 of the wear plate 18 along the entire lines of contact 67 of the bearing surfaces 37 with the wear plate 18, and with minimal or no transverse movement of bearing surfaces 37 of the rollers 35 relative to the carrier beam 7 adjacent the lines of contact 67 of the bearing surfaces 37 of the rollers 35 with the wear plate 18.

And so, operation of the rotary milking platform 1 continues with the rollers 35 of the support elements 10 following the wear plate 18.

Referring now to FIGS. 15 to 19, there is illustrated a support element according to another embodiment of the invention indicated generally by the reference numeral 80 for supporting a platform similar to the platform 3 of the rotary milking platform 1 described with reference to FIGS. 1 to 14. It is envisaged that a plurality of the support elements 80 would be provided in a pit similar to the pit 12 of the rotary milking platform 1 arranged circumferentially around the central axis of rotation 8 of the platform 3 and spaced apart along the carrier beam 7 for supporting and rotatably engaging the carrier beam 7 in similar manner as the support elements 10 support and rotatably engage the carrier beam 7.

The support element 80 is substantially similar to the support elements 10 described with reference to FIGS. 1 to 14, and similar components are identified by the same reference numerals. The main difference between the support element 80 and the support elements 10 is in the arrangement of the guide bolts 50 and the compression springs 59 relative to the roller 35. Additionally, in this embodiment of the invention limit means for limiting the downward travel of the carrier element 34 towards the anchor plate 27 is provided by a pair of limit bolts 82.

Turning initially to the positioning of the guide bolts 50 and the compression springs 59, in this embodiment of the invention the guide bolts 50 and the compression springs 59 are located at the respective opposite sides of the roller 35, but the guide bolts 50 of the pair of the guide bolts 50a and 50b and the pair of the guide bolts 50c and 50d are located closer together than are the guide bolts 50 of the pairs of guide bolts 50a and 50b, and 50c and 50d of the support element 10. However, in this embodiment of the invention each of the guide bolts 50a and 50b of the pair thereof, and each of the guide bolts 50c and 50d of the pair thereof are located on respective opposite sides of the vertical plane 62 which contains the tilt access 61 and are equi-distant from the vertical plane 62 on the respective opposite sides thereof. Additionally, each of the guide bolts 50 of the pairs 50a and 50b, and 50c and 50d thereof are also located on respective opposite sides of the vertical plane 64 containing the rotational axis 36 of the roller 35, and are located equi-distant from the vertical plane 64 on the respective opposite sides thereof. The compression springs 59 are coaxial with the corresponding ones of the guide bolts 50, and therefore the positions of the compressions springs 59 is substantially similar to that of the corresponding guide bolts 50.

In this embodiment of the invention the spacing between the guide bolts 50 of each pair of guide bolts 50a and 50b, and 50c and 50d, and in turn the spacing between the compression springs 59 of each pair of compression springs 59a and 59b, and 59c and 59d is less than the axial length of the roller 35 between the opposite ends 68 and 69 thereof. This permits the width of the carrier element 34 in the axial direction of the rotational axis 36 of the roller 35 to be reduced. However, in this embodiment of the invention the heads 53 of the guide bolts 50 are located beneath the path of the carrier beam 7, and therefore the carrier plate 40 of the carrier element 34 must be located at a level lower than the line of contact 67 of the bearing surface 37 of the roller 35 with the under surface 38 of the wear plate 18 of the carrier beam 7, than in the case of the support element 10 in order to provide clearance between the carrier plate 40 and the under surface 38 of the wear plate 18 of the carrier beam 7 to accommodate the heads 53 of the guide bolts 50. Thus, in this embodiment of the invention the tilt axis 61 which lies in the plane 65 defined by the carrier plate 40 of the carrier element 34 is at a lower level below the line of contact 67 of the bearing surface 37 of the roller 35 than is the case in the support element 10. In this embodiment of the invention the tilt axis 61 is at a level, the distance of which is below the line of contact 67 of the bearing surface 37 of the roller 35 is approximately fifty percent of the radius of the roller 35. However, it will be appreciated that the tilt axis 61 may be at a level below the line of contact 67 of the bearing surface 37 of the roller 35, the distance of which is less than fifty percent of the radius of the roller 35, provided sufficient clearance is provided between the carrier plate 40 of the carrier element 34 and the under surface of the wear plate 18 of the carrier beam 7 to accommodate the heads 53 of the guide bolts 50.

Turning now to the limit bolts 82, each limit bolt 82 comprises a head 83 and a shank 84 extending downwardly from the head 83 and terminating in a threaded end 85 which extends through a corresponding bore (not shown) in the anchor plate 27. A pair of nuts 86 and 87 on the threaded end 85 of each limit bolt 82 secures the limit bolt 82 to the anchor plate 27 with the anchor plate 27 clamped between the nuts 86 and 87. The position of the head 83 of each limit bolt 82 relative to the anchor plate 27 and in turn relative to the carrier element 34 is adjustable by adjusting the positions of the nuts 86 and 87 on the threaded end 85 of the shank 84 of the corresponding limit bolt 82. The limit bolts 82 are adjusted so that the heads 83 thereof are positioned to engage the under surface 60 of the carrier plate 40 of the carrier element 34 in order to avoid excessive compression of the compression springs 59 by excessive downward movement of the carrier plate 40 to thereby avoid damage to the compression springs 59.

Bores 33 in the anchor plate 27 accommodate mounting bolts similar to the mounting bolts 28 for adjustably mounting the anchor plate 27 and in turn the support element 80 on a corresponding ground engaging mounting element, similar to the ground engaging mounting elements 20 of the support element 10.

Otherwise, the support element 80 is similar to the support element 10, and its use in conjunction with a platform similar to the platform 3 of the milking parlour 1 for supporting and rollably engaging a carrier beam is similar to the support element 10 described with reference to FIGS. 1 to 14.

Although not illustrated in the support elements 10 described with reference to FIGS. 1 to 14, it is envisaged that the support elements 10 may be provided with one or a pair of limit bolts similar to the limit bolts 82 for limiting the amount of downward movement of the carrier element 34 towards the anchor plate 27 in order to avoid excessive compression of the compression springs 59.

While the support elements have been described for use in supporting a carrier beam of a rotary milking platform it will be readily apparent to those skilled in the art that the support elements according to the invention may be used for supporting a carrier beam of any other rotary platform, for example, a rotary stage in a theatre, or a rotary platform for any other use or purpose. It will also be appreciated that the support elements according to the invention may be provided for supporting any beam which is moveable in its length direction, irrespective of whether the beam is provided for supporting a rotary platform or otherwise. Indeed, it is envisaged that the support elements according to the invention may be provided for supporting an elongated beam, which would, for example, reciprocate in its length direction with rectilinear motion, or move in a single direction with rectilinear motion.

In cases where the support elements according to the invention are configured for supporting an elongated beam which is configured to move with rectilinear motion, it is envisaged that the rollers of the support elements will be cylindrical rollers with the bearing surface of each roller extending parallel to the rotational axis of the roller, and with the axis of each roller extending transversely of the beam and the tilt axis extending substantially parallel to the beam.

While the carrier elements of the support elements have been described as being provided by a carrier plate, any other suitable carrier element may be provided. It will of course be appreciated that while it is desirable that the carrier element should be configured for maintaining the tilt axis in a plane as close as possible to the line of contact of the bearing surface of the roller with the beam being supported, it is envisaged that adequate results would be achieved provided that the tilt axis is contained in a plane above the rotational axis of the roller, and preferably, within a distance of seventy-five percent of the length of the radius of the bearing surface of the roller below the line of contact of the bearing surface of the roller with the beam, and advantageously, within a distance of fifty percent of the length of the radius of the bearing surface of the roller below the line of contact of the bearing surface of the roller with the beam, and more preferably, within a distance of twenty-five percent of the length of the radius of the bearing surface of the roller below the line of contact of the bearing surface of the roller with the beam, and ideally, within a distance of ten percent of the length of the radius of the bearing surface of the roller below the line of contact of the bearing surface of the roller with the beam being supported, and most ideally, within a distance of five percent of the length of the radius of the bearing surface of the roller below the line of contact of the bearing surface of the roller with the beam.

It will also be appreciated that while the rollers of the support elements have been described as comprising a tapering bearing surface, while this is desirable, in certain cases, it is envisaged that the bearing surface of some or all of the rollers may be slightly concave or convex.

While the resilient mounting elements of the support elements have been described as comprising compression springs, any suitable resilient mounting elements may be provided for resiliently mounting the carrier element and in turn the roller of the support element to be moveable upwardly and downwardly to accommodate upward and downward movement of the carrier beam as the platform rotates, and also to accommodate tilting of the carrier element, and in turn the corresponding roller for accommodating non-horizontality of the wear plate of the carrier beam as the platform rotates. For example, such resilient mounting elements may comprise resilient elements of rubber or a resilient plastics material, pneumatic or hydraulic springs. Indeed, in certain cases, tension springs instead of compression springs could be provided whereby the carrier element of each support element would be suspended by suitably mounted tension springs. The resilient mounting elements may also be provided by leaf springs.

It is also envisaged that while each support element has been described as comprising four resilient mounting elements, in some embodiments of the invention two resilient mounting elements may be sufficient provided on respective opposite sides of the vertical plane containing the tilt axis which bisects the roller between its respective opposite ends. Additionally, it is envisaged that in some cases three resilient mounting elements may be provided, and the three resilient mounting elements would be configured as a single pair of mounting elements whereby the resilient mounting elements of the pair would be located on respective opposite sides of the vertical plane containing the tilt axis, and the single resilient mounting element would be contained in the vertical plane containing the tilt axis. Needless to say, more than four resilient mounting elements may be provided, and where an even number of resilient mounting elements is provided, the mounting elements would be provided in pairs.

It will also be appreciated that while the vertical plane containing the tilt axis has been described as also bisecting the roller between its respective opposite ends, while this is desirable, it is believed to be not essential. In some cases, the vertical plane containing the tilt axis may be located closer to one end of the roller than to the other end of the roller.

It will also be appreciated that while the resilient mounting elements and the corresponding guide bolts have been described as being coaxially arranged relative to each other, while this is desirable when the resilient mounting elements are provided by compression springs, it is not essential. Indeed, where other suitable resilient mounting means besides compression springs are provided, it is envisaged that the guide bolts may be located at a different location to the resilient mounting elements, and it will also be appreciated that the number of guide bolts may be different to the number of resilient mounting elements.

While the roller of each support element has been described as comprising a tapering roller, while as discussed above this is desirable, in some embodiments of the invention it is envisaged that the roller of each support element may be provided as a cylindrical roller, even where the carrier beam is of arcuate or circular shape.

It is also envisaged that while the mounting elements have been described as comprising ground engaging mounting elements through which the support elements are adjustably mounted to the base of the pit, while the provision of ground engaging mounting elements is desirable, it is not essential, and in some embodiments of the invention the support elements may be mounted directly on the base of the pit, or on respective plinths or other suitable spacer elements mounted on the base of the pit.

While the roller 35 has been described as being of steel material, the roller 35 may be of any other suitable material.

The invention claimed is:

1. A support element for supporting an elongated beam configured to move in its length direction, the support element comprising:
   an anchor element for anchoring the support element,
   a carrier element mounted on the anchor element,
   a roller rotatably mounted on the carrier element about a rotational axis and defining a peripheral bearing surface configured for supporting and rollably engaging the beam on an underside thereof, wherein
   the carrier element is tiltably mounted on the anchor element about a tilt axis, the tilt axis being contained in a plane spaced apart above a plane containing the rotational axis of the roller.

2. A support element as claimed in claim 1 in which the plane containing the tilt axis is located adjacent or below a line of contact of the bearing surface of the roller with the beam.

3. A support element as claimed in claim 1 in which the tilt axis extends substantially orthogonally relative to a vertical plane containing the rotational axis of the roller.

4. A support element as claimed in claim 1 in which a guide means extending from the anchor element cooperates with the carrier element for guiding the carrier element relative to the anchor element, the guide means being configured for controlling the tilting movement of the carrier element about the tilt axis.

5. A support element as claimed in claim 1 in which the support element is configured to support a beam moving in its length direction along an arcuate path about a centre of radius, and the roller comprises a tapering roller defining a tapering bearing surface, the tapering bearing surface thereof tapering from one end of the roller of maximum diameter to the other end of the roller of minimum diameter, in a direction towards the centre of radius of the arcuate path of the beam.

6. A support element as claimed in claim 1 in which at least one limit means for limiting excessive travel of the carrier element towards the anchor element is provided.

7. In combination a beam and the support element as claimed in claim 1 supporting the beam with the rotational axis of the roller extending substantially transversely of the beam.

8. A rotary platform comprising;
   a platform,
   an elongated carrier beam formed into a circular shape and mounted on the underside of the platform for supporting the platform,
   the carrier beam defining a central axis of rotation of the platform and being supported on a plurality of support elements located at circumferentially spaced apart intervals around the central axis of rotation of the platform beneath the carrier beam, each support element comprising:
   an anchor element for anchoring the support element,
   a carrier element mounted on the anchor element,
   a roller rotatably mounted on the carrier element about a rotational axis and defining a peripheral bearing surface configured for supporting and rollably engaging the carrier beam on an underside thereof, wherein
   the carrier element of each support element is tiltably mounted on the corresponding anchor element about a tilt axis, the tilt axis being contained in a plane spaced apart above a plane containing the rotational axis of the roller thereof.

9. A rotary platform as claimed in claim 8 in which the carrier element of each support element is resiliently mounted on the anchor element thereof on at least two resilient mounting elements located spaced apart from each other in an axial direction relative to the rotational axis of the roller on respective opposite sides of the tilt axis.

10. A rotary platform as claimed in claim 8 in which the roller of each support element comprises a tapering roller defining a tapering bearing surface, the tapering bearing surface thereof tapering from one end of the roller of maximum diameter to the other end of the roller of minimum diameter, in a direction towards the central axis of rotation of the platform, the tapering angle of the bearing surface of the roller of each support element being such that the apex of the cone angle defined by the bearing surface of the roller coincides with the central axis of rotation of the platform.

11. A method for supporting an elongated beam, the beam being moveable in its lengths direction, the method comprising supporting the beam on at least one roller rotatable about a rotational axis extending substantially transversely of the beam, and tiltable about a tilt axis extending substantially parallel to the beam, the tilt axis being contained in a plane spaced apart above a plane containing the rotational axis of the roller.

12. A support element as claimed in claim 1 in which the plane containing the tilt axis is located at a level not more than seventy-five percent of the length of the radius of the bearing surface of the roller below the line of contact of the bearing surface of the roller with the beam.

13. A support element as claimed in claim 1 in which the plane containing the tilt axis is located at a level not more than fifty percent of the length of the radius of the bearing surface of the roller below the line of contact of the bearing surface of the roller with the beam.

14. A support element as claimed in claim 1 in which the carrier element substantially defines a plane containing the tilt axis.

15. A support element as claimed in claim 5 in which the tapering angle of the bearing surface of the roller is selected so that if the roller were placed on a horizontal surface, and rolled along the horizontal surface, the roller would follow an arcuate path of radius similar to the radius of the arcuate path of movement of the beam.

16. A support element for supporting an elongated beam configured to move in its length direction, the support element comprising:
   an anchor element for anchoring the support element,
   a carrier element resiliently and tiltably mounted on the anchor element and tiltable about a tilt axis, the resilient mounting of the carrier element on the anchor element being configured for accommodating the tilting of the carrier element about the tilt axis, and
   a roller rotatably mounted on the carrier element about a rotational axis and defining a peripheral bearing surface configured for supporting and rollably engaging the beam on an underside thereof, the roller being rotatably mounted on the carrier element so that the tilt axis is contained in a plane spaced apart above a plane containing the rotational axis of the roller.

17. A support element as claimed in claim 16 in which the carrier element is resiliently mounted on the anchor element on at least two resilient mounting elements located spaced apart from each other in an axial direction relative to the rotational axis of the roller, on respective opposite sides of the tilt axis.

18. A support element as claimed in claim 17 in which each resilient mounting element comprises a compression spring.

19. A support element for supporting an elongated beam configured to move in its length direction along an arcuate path about a centre of radius, the support element comprising:
   an anchor element for anchoring the support element,
   a carrier element tiltably mounted on the anchor element and tiltable about a tilt axis, and
   a roller rotatably mounted on the carrier element about a rotational axis so that the tilt axis is contained in a plane spaced apart above a plane containing the rotational axis of the roller, the roller defining a peripheral tapering bearing surface configured for supporting and rollably engaging the beam on an underside thereof, the tapering bearing surface tapering at an angle from one end of the roller of maximum diameter to the other end of the roller of minimum diameter in a direction towards the centre of radius of the arcuate path of the beam, the tapering angle of the bearing surface of the roller being such that an apex of a cone angle defined by the tapering bearing surface of the roller coincides with the centre of radius of the arcuate path of the beam.

20. A rotary platform comprising:
a platform,
an elongated carrier beam formed into a circular shape and mounted on the underside of the platform for supporting the platform, the carrier beam defining a central axis of rotation of the platform and being supported on
a plurality of support elements located at circumferentially spaced apart intervals around the central axis of rotation of the platform beneath the carrier beam, each support element comprising:
   an anchor element for anchoring the support element,
   a carrier element resiliently and tiltably mounted on the corresponding anchor element and tiltable about a tilt axis, the resilient mounting of the carrier element of each support element on the anchor element thereof is configured for accommodating the tilting of the carrier element about the tilt axis, and
   a roller rotatably mounted on the carrier element about a rotational axis and defining a peripheral bearing surface configured for supporting and rollably engaging the carrier beam on an underside thereof, the roller being mounted on the carrier element of the corresponding support element, so that the tilt axis is contained in a plane spaced apart above a plane containing the rotational axis of the roller.

* * * * *